(12) United States Patent
Li et al.

(10) Patent No.: US 10,317,687 B2
(45) Date of Patent: Jun. 11, 2019

(54) LIGHT PATH ADJUSTER AND DISPLAY DEVICE INCLUDING THE SAME

(71) Applicant: Samsung Electronics Co., Ltd., Suwon-si, Gyeonggi-do (KR)

(72) Inventors: Weiming Li, Chaoyang District Beijing (CN); Kang Xue, Chaoyang District Beijing (CN); Tao Hong, Chaoyang District Beijing (CN); Xiying Wang, Chaoyang District Beijing (CN); Mingcai Zhou, Chaoyang District Beijing (CN); Zhihua Liu, Chaoyang District Beijing (CN); Gengyu Ma, Chaoyang District Beijing (CN); Haitao Wang, Chaoyang District Beijing (CN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 444 days.

(21) Appl. No.: 14/935,798

(22) Filed: Nov. 9, 2015

(65) Prior Publication Data

US 2016/0170222 A1    Jun. 16, 2016

(30) Foreign Application Priority Data

Dec. 16, 2014 (CN) .......................... 2014 1 0784388
Aug. 5, 2015  (KR) ......................... 10-2015-0110641

(51) Int. Cl.
*G02B 27/22*    (2018.01)
*G02B 3/08*     (2006.01)
(Continued)

(52) U.S. Cl.
CPC ....... *G02B 27/2214* (2013.01); *G02B 3/0056* (2013.01); *G02B 3/08* (2013.01); *H04N 13/305* (2018.05)

(58) Field of Classification Search
CPC .......... G02F 1/13336; G02F 1/133524; G02F 1/133526; G02F 1/1335; G06F 3/1446;
(Continued)

(56) References Cited

U.S. PATENT DOCUMENTS 6,115,092 A * 9/2000 Greene ................... G06F 3/147
                                                    345/88
7,733,310 B2 * 6/2010 Hajjar .................... B82Y 10/00
                                                    345/84
(Continued)

FOREIGN PATENT DOCUMENTS

JP       2001-013878 A    1/2001
KR   10-1999-0046016 A    6/1999
(Continued)

*Primary Examiner* — Patrick N Edouard
*Assistant Examiner* — Peijie Shen
(74) *Attorney, Agent, or Firm* — Harness, Dickey & Pierce, P.L.C.

(57) ABSTRACT

A display device may include a plurality of display panels, and light path adjusters disposed on upper portions of the plurality of the display panels. The light path adjusters include a lens array configured to transfer different beams emitted from the plurality of display panels to each eye of a user, and a joint removal structure disposed on one side of the light path adjusters corresponding to a connecting joint that connects the plurality of display panels. The joint removal structure is configured to refract the beams emitted from the plurality of display panels.

20 Claims, 8 Drawing Sheets

(51) Int. Cl.
  *G02B 3/00* (2006.01)
  *H04N 13/305* (2018.01)
(58) Field of Classification Search
  CPC ..... G09G 2300/026; G09G 2310/0232; G09G 2320/0233; G02B 6/0008; G02B 6/0078; G02B 27/0905; G02B 3/0056; G02B 6/06
  See application file for complete search history.

(56) References Cited

U.S. PATENT DOCUMENTS

| | | | | |
|---|---|---|---|---|
| 8,368,729 | B2 * | 2/2013 | Watanabe | G02B 3/08 345/1.3 |
| 9,146,400 | B1 * | 9/2015 | Lee | G02B 3/0037 |
| 2002/0047837 | A1 * | 4/2002 | Suyama | G02B 27/2271 345/204 |
| 2003/0231144 | A1 * | 12/2003 | Cho | G02B 5/045 345/1.3 |
| 2004/0051944 | A1 * | 3/2004 | Stark | G02F 1/13336 359/448 |
| 2006/0077544 | A1 * | 4/2006 | Stark | G02F 1/13336 359/448 |
| 2009/0102862 | A1 * | 4/2009 | Miller | G06F 3/1446 345/634 |
| 2009/0207096 | A1 * | 8/2009 | Lee | G02F 1/13336 345/1.3 |
| 2009/0225538 | A1 * | 9/2009 | Horikoshi | G02B 3/005 362/225 |
| 2010/0073641 | A1 * | 3/2010 | Han | G02B 5/06 353/38 |
| 2010/0109988 | A1 * | 5/2010 | Kao | G02F 1/133526 345/87 |
| 2010/0232027 | A1 * | 9/2010 | Park | G02B 3/02 359/625 |
| 2011/0038051 | A1 * | 2/2011 | Shin | G02B 3/005 359/619 |
| 2011/0102302 | A1 * | 5/2011 | Watanabe | G02F 1/13336 345/4 |
| 2011/0109535 | A1 * | 5/2011 | Watanabe | G02F 1/13336 345/87 |
| 2011/0285934 | A1 * | 11/2011 | Watanabe | G02F 1/133526 349/58 |
| 2013/0093646 | A1 | 4/2013 | Curtis et al. | |
| 2013/0235561 | A1 * | 9/2013 | Etienne | G02F 1/133308 362/97.1 |
| 2014/0126183 | A1 * | 5/2014 | Geng | G02B 5/045 362/97.1 |
| 2014/0192282 | A1 * | 7/2014 | Wu | G02B 27/2214 349/15 |
| 2015/0054928 | A1 * | 2/2015 | Wu | H04N 13/305 348/59 |
| 2015/0092395 | A1 * | 4/2015 | Wu | G02B 6/0051 362/97.1 |
| 2015/0116852 | A1 * | 4/2015 | Kim | G02B 17/002 359/834 |
| 2016/0054606 | A1 * | 2/2016 | Saishu | G02F 1/13336 349/57 |

FOREIGN PATENT DOCUMENTS

| | | |
|---|---|---|
| KR | 2001-0079154 A | 8/2001 |
| KR | 2004-0005665 A | 1/2004 |
| KR | 2011-0018212 A | 2/2011 |
| KR | 10-1178634 B1 | 8/2012 |
| KR | 2013-0020299 A | 2/2013 |
| KR | 2013-0058262 A | 6/2013 |
| KR | 10-1298609 B1 | 8/2013 |
| KR | 2013-0124779 A | 11/2013 |
| WO | WO-2010-095486 A1 | 8/2010 |

* cited by examiner

LIGHT PATH ADJUSTER AND DISPLAY DEVICE INCLUDING THE SAME

CROSS-REFERENCE TO RELATED APPLICATION

This application claims under 35 U.S.C. § 119 to Korean Patent Application No. 10-2015-0110641, filed on Aug. 5, 2015, in the Korean Intellectual Property Office, and Chinese Patent Application No. 201410784388.9, filed on Dec. 16, 2014, in the State Intellectual Property Office of China, the entire contents of which are incorporated herein by reference in its entirety.

BACKGROUND

1. Field

At least one example embodiment relate to a light path adjuster and a display device including the same.

2. Description of the Related Art

An integral imaging display (IID) is a naked eye (i.e., glasses-free) three-dimensional (3D) display technology. In general, the IID is provided in a lens array, a flat panel display (FPD), and a processor. The FPD is a device for generating a 3D image in an observation space. For example, the FPD includes a liquid crystal display (LCD). An image displayed on the FPD is referred to as an elemental image array (EIA).

SUMMARY

Some example embodiments relate to a display device.

In some example embodiment, the device may include a plurality of display panels, and light path adjusters disposed on upper portions of the plurality of the display panels, wherein the light path adjusters may include a lens array configured to transfer different beams emitted from the plurality of display panels to each eye of a user, and a joint removal structure configured to refract the beams emitted from the plurality of display panels, the joint removal structure disposed on one side of the light path adjusters corresponding to a connecting joint to connect the plurality of display panels.

The joint removal structure may be configured to refract the beams emitted from the plurality of display panels in order for the connecting joint not to be exposed to the user.

The joint removal structure may be formed based on a boundary direction among the plurality of display panels.

The light path adjusters may be provided in a form of a layer, and the lens array and the joint removal structure are disposed on an identical side or different sides of the light path adjusters.

The light path adjusters may include a lens array layer and a joint removal layer, the lens array is disposed on one side of the lens array layer, and the joint removal structure is disposed on one side of the joint removal layer.

A number of joint removal structures may be identical to a number of connecting joints connecting the plurality of display panels.

The joint removal structure may be a wedge-shaped groove structure.

A cross section of the wedge-shaped groove structure may be a flat surface or a curved surface.

A space within the wedge-shaped groove structure may be a vacuum or filled with a gas, a liquid, or a solid.

The joint removal structure may be a structure to which a Fresnel lens structure is applied.

When the lens array and the joint removal structure are disposed on an identical side of the light path adjusters, a first area of the light path adjusters corresponding to the plurality of display panels may include the lens array, and a second area of the light path adjusters corresponding to the connecting joint may include the joint removal structure to which the Fresnel lens structure is applied.

The display device may further include a transparent optical layer configured to adjust a moving distance of beams from the plurality display panels to the lens array, the transparent optical layer disposed between the light path adjusters and the plurality of display panels.

A gap between the light path adjusters and the transparent optical layer may be a vacuum or filled with a gas, a liquid, or a solid.

The display device may further include a processor configured to correct a deformation of an image displayed on the plurality of display panels.

The processor may be configured to receive a photographed image from an image sensor that photographs a code image displayed on the plurality of display panels, estimate an image generating model based on the code image and the photographed image, and correct the deformation of the image displayed on the plurality of display panels.

Other example embodiments relate to a light path adjuster to guide beams emitted from a display panel.

In some example embodiments, the light path adjuster may include a lens array configured to transfer the different beams emitted from the display panel to each eye of a user, and a joint removal structure configured to refract the beams emitted from the display panel, the joint removal structure disposed on one side of the light path adjuster corresponding to a connecting joint to connect the display panel with another display panel, wherein the light path adjuster is disposed on an upper portion of the display panel.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION OF EXAMPLE EMBODIMENTS

Figure 1:
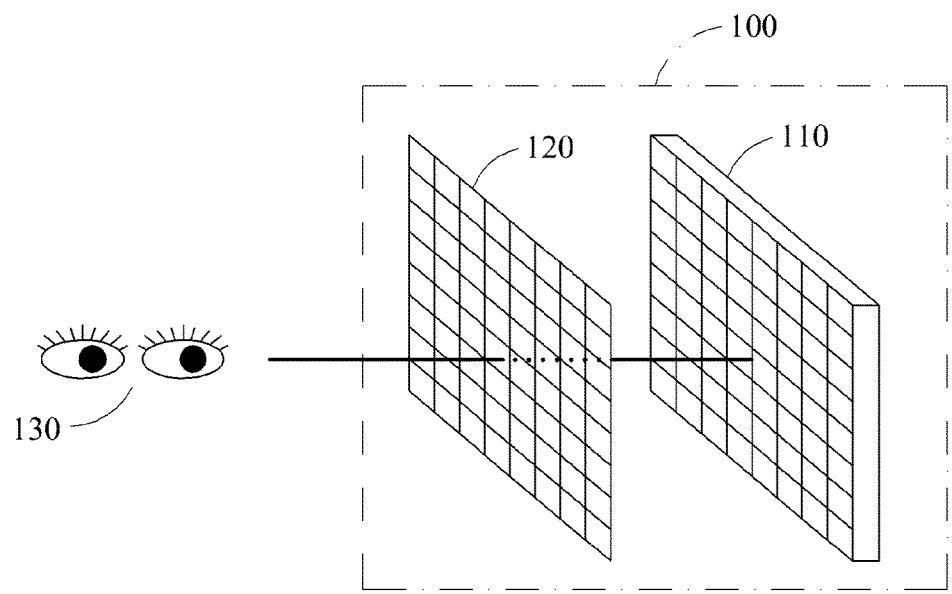
FIG. 1 illustrates a display device according to at least one example embodiment.

Inventive concepts will now be described more fully with reference to the accompanying drawings, in which example embodiments of are shown. These example embodiments are provided so that this disclosure will be thorough and complete, and will fully convey inventive concepts of to those skilled in the art. Inventive concepts may be embodied in many different forms with a variety of modifications, and a few embodiments will be illustrated in drawings and explained in detail. However, this should not be construed as being limited to example embodiments set forth herein, and rather, it should be understood that changes may be made in these example embodiments without departing from the principles and spirit of inventive concepts, the scope of which are defined in the claims and their equivalents. Like numbers refer to like elements throughout. In the drawings, the thicknesses of layers and regions are exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., electronic imaging systems, image processing systems, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "and/or" includes any and all combinations of one or more of the associated listed items. Expressions such as "at least one of," when preceding a list of elements, modify the entire list of elements and do not modify the individual elements of the list.

FIG. 1 illustrates a display device 100 according to at least one example embodiment.

Referring to FIG. 1, the display device 100 includes display panels 110, and light path adjusters 120. The display device 100 refers to a device for outputting an image and thus, any type of device configured to output an image by applying a power may be employed as the display device 100. The display device 100 may provide a three-dimensional (3D) image for a user 130. The user 130 may view a 3D image displayed on the display panels 110 through the light path adjusters 120.

The display panels 110 are flat panel displays to display a 3D image based on an image signal to be input, and the display panels 110 are connected to each other. A connecting joint to connect the display panels 110 is disposed between a boundary among the display panels 110, and the display panels 110 may display a single image.

Each of the display panels 110 may be divided into a display area displaying an image and a frame area surrounding the display area. The frame area is an area in which the image is not displayed, and supports the display area.

The light path adjusters 120 may guide beams emitted from the display panels 110 to the user 130. The light path adjusters 120 may correspond to the display panels 110, respectively. Thus, a number of the light path adjusters 120 may be identical to a number of the display panels 110.

The light path adjusters 120 include a lens array to transfer different beams emitted from the display panels 130 to each eye of the user 130, and a joint removal structure to refract the beams emitted from the display panels 110 The joint removal structure may be disposed on one side of the light path adjusters 120 corresponding the connecting joint. In an optical structure design, the light path adjusters 120 may function to disperse the beams emitted from the display panels 110 and conceal the connecting joint so that the connecting joint is not exposed to (or visible to) the user 130.

The function of dispersing the beams emitted from the display panels 110 may be provided through the lens array included in the light path adjusters 120. The lens array is an apparatus that transfers the different beams emitted from the display panels 110 to each eye of the user 130. For example, a lens array 210 may include a prism lens or lenses that are vertically and horizontally formed. The user 130 may view a 3D image displayed in the display device 100 through the lens array. The 3D image may be provided based on stereo view principles through eyes of the user 130.

The function in which the connecting joint is not exposed to the user 130 may be provided based on a joint removal structure included in the light path adjusters 120. The joint removal structure is disposed on an area corresponding to the connecting joint. The joint removal structure may refract beams incident to the area corresponding to the connecting joint in order for the connecting joint not to be exposed to the user 130. The connecting joint may refract beams such that beams emitted from the display area of the display panels 110 are guided to the user 130.

The joint removal structure corresponds to a single connecting joint. A number of removal structures included in the light path adjusters 120 is identical to a number of connecting joints included in the display panels 110. The joint removal structure is formed based on a boundary direction among the display panels 110.

In an example, the light path adjusters 120 are provided in a layer, and the lens array and the connecting joint are disposed on an identical side or different sides of the light path adjusters 120. In another example, the light path adjusters 120 include a lens array layer and a joint removal layer. In this example, the lens array is disposed on one side of the lens array layer and the joint removal structure is disposed on one side of the joint removal layer.

The joint removal structure is a wedge-shaped groove structure. A cross section of the wedge-shaped groove structure is a flat surface or a curved surface. The joint removal structure corresponding to the wedge-shaped groove structure will be described with reference to FIGS. 2 through 8.

Alternatively, a Fresnel lens structure is applied to the joint removal structure. The joint removal structure to which the Fresnel lens structure is applied will be described with reference to FIGS. 9 through 14.

A transparent optical layer to adjust a moving distance of beams from the display panels 110 to the lens array may be additionally disposed between the light path adjusters 120 and the display panels 110. The transparent optical layer has a thickness set based on a focal distance value of the lens array such that a focal point of the lens array is placed on the display panels 110. For example, the transparent optical layer may be a transparent flat glass plate. A gap between the light path adjusters 120 and the transparent optical layer is a vacuum or filled with a gas, a liquid, or a solid.

Figure 2:
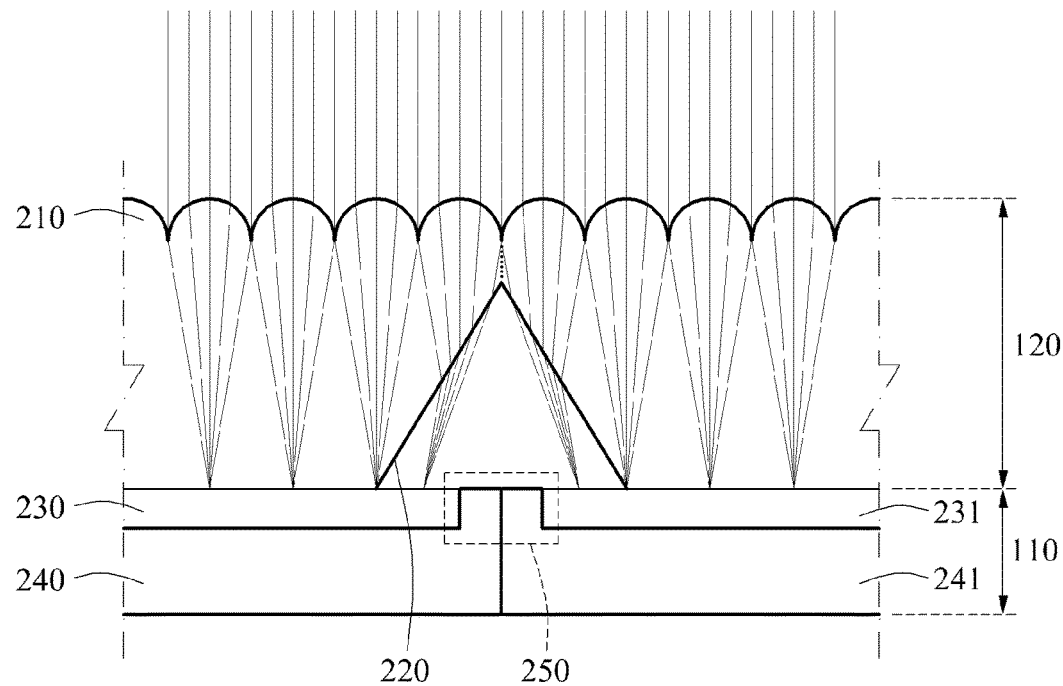
FIGS. 2 through 4 illustrate examples of which a joint removal structure included in a light path adjuster in a single layer is a wedge-shaped groove structure according to at least one example embodiment.
Figure 3:
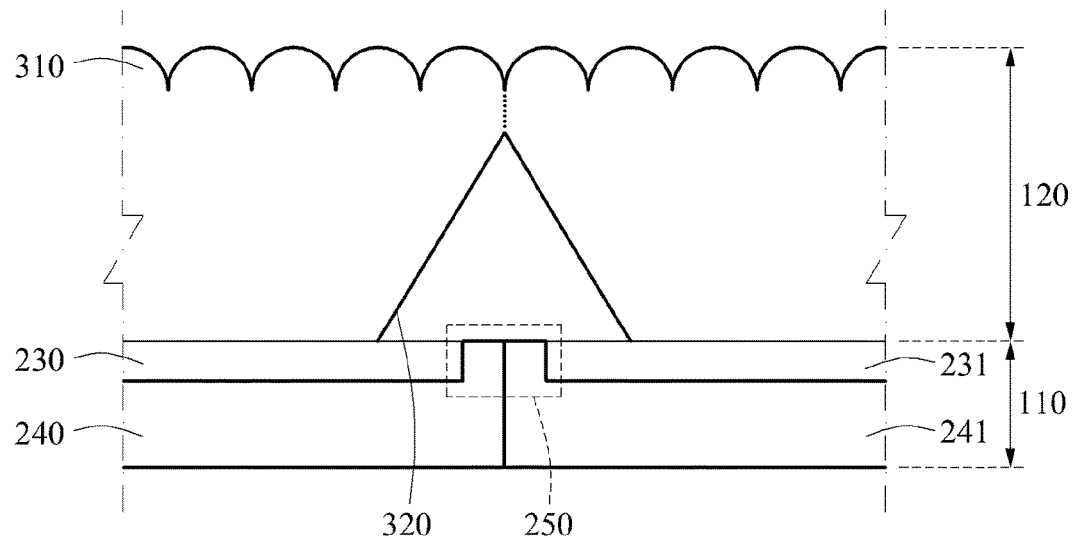
Figure 4:
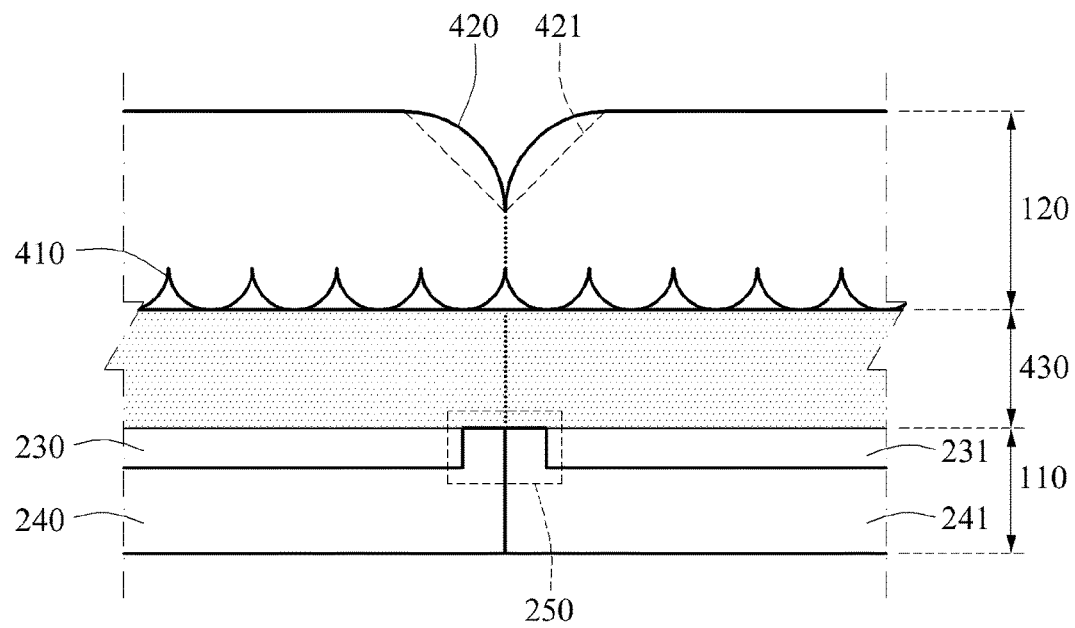

FIGS. 2 through 4 illustrate examples of which a joint removal structure included in a light path adjuster in a single layer is a wedge-shaped groove structure according to at least one example embodiment.

FIG. 2 illustrates an example of the light path adjusters 120 including a joint removal structure 220 corresponding to a wedge-shaped groove structure, and the joint removal structure 220 is formed in a single layer. A cross section of the joint removal structure 220 is a flat surface.

The display panels 110 illustrated in FIG. 2 refer to two display panels adjacent to each other. The display panels 110 include display areas 230 and 231 displaying an image and frame areas 240 and 241 surrounding the display areas 230 and 231. The frame areas 240 and 241 are areas in which the image is not displayed, and support the display areas 230 and 231.

The display panels 110 may be connected to each other through a connecting joint 250. The connecting joint 250 is formed based on a boundary direction among the display panels 110.

The lens array 210 is disposed on one side of the light path adjusters 120, and the joint removal structure 220 is disposed on another side of the light path adjusters 120. The lens array 210 is disposed on a front surface of the light path adjusters 120, and the front surface is toward or closest to a user. The joint removal structure 220 corresponding to the wedge-shaped groove structure is disposed on a back surface of the light path adjusters 120.

The back surface of the light path adjusters 120 may be divided into a first area and a second area. The first area corresponds to the display areas 230 and 231, and the first area includes a flat structure. A non-linear refraction is not generated with respect to a beam incident to the first area. The second area corresponds to the connecting joint 250, and the second area includes the joint removal structure 220. A non-linear refraction by the joint removal structure 220 is generated with respect to a beam incident to the second area. Due to the non-linear refraction generated by the joint removal structure 220, beams emitted from the display areas 230 and 231 are transferred to the user.

Differently from the lens array 210, the joint removal structure 220 is included in the second area corresponding to the connecting joint 250 and a flat structure is included in the first area corresponding to the display areas 230 and 231. The joint removal structure 220 is formed based on a boundary direction among the adjacent display panels 110. The joint removal structure 220 corresponds to the connecting joint 250, and a number of joint removal structures, for example, the joint removal structure 220, may be identical to a number of connecting joints, for example, the connecting joint 250, to connect the display panels 110. A surface configuring the joint removal structure 220 may be a flat surface.

The joint removal structure 220 refracts beams emitted from the display areas 230 and 231 adjacent to a boundary of the display panels 110 in order for the connecting joint 250 not to be exposed to the user. Concisely, the beams emitted from the display areas 230 and 231 by the refraction by the joint removal structure 220 may be transferred to the user. Accordingly, a user viewing a display device does not recognize the connecting joint 250 or the frame areas 240 and 241 in which an image is not displayed.

Hereinafter, differences on various examples of the joint removal structure 220 corresponding to the wedge-shaped groove structure included in a light path adjuster in a single layer will be described with reference to FIGS. 3 and 4.

FIG. 3 illustrates another example of the light path adjusters 120 including a joint removal structure 320 corresponding to a wedge-shaped groove structure, and the joint removal structure 320 is formed in a single layer. A cross section of the joint removal structure 320 is a flat surface.

The display panels 110 illustrated in FIG. 3 refer to two display panels adjacent to each other, and include the display areas 230 and 231 and the frame areas 240 and 241.

Referring to FIG. 3, a lens array 310 is included on one side of the light path adjusters 120, and a joint removal structure 320 is included on another side of the light path adjusters 120. The lens array 310 is disposed on a front surface of the light path adjusters 120, and the joint removal structure 320 corresponding to the wedge-shaped groove structure is disposed on a back surface of the light path adjusters 120.

The joint removal structure 320 is formed based on a boundary direction among the adjacent display panels 110. The joint removal structure 320 is disposed in an area corresponding to the connecting joint 250. A number of joint removal structures, for example, the joint removal structure 320, may be identical to a number of connecting joints, for example, the connecting joint 250, to connect the display panels 110.

FIG. 4 illustrates still another example of the light path adjusters 120 including a joint removal structure 420 corresponding to a wedge-shaped groove structure, and the joint removal structure 420 is formed in a single layer. In this example, the light path adjusters 120 further include a transparent layer 430.

The display panels 110 refer to two display panels adjacent to each other. The display panels 110 includes the display panels 230 and 231 and the frame areas 240 and 241.

Referring to FIG. 4, the joint removal structure 420 corresponding to the wedge-shaped groove structure is disposed on a front surface of the light path adjusters 120, and a lens array 410 is disposed on a back surface of the light path adjusters 120.

The back surface of the light path adjusters 120 may be divided into a first area and a second area. The first area corresponds to the display areas 230 and 231 and includes a flat structure. A non-linear refraction is not generated with respect to a beam incident to the first area. The second area corresponds to the connecting joint 250 and includes the joint removal structure 220. A non-linear refraction by the joint removal structure 220 is generated with respect to a beam incident to the second area. Due to the non-linear refraction generated by the joint removal structure 220, beams emitted from the display areas 230 and 231 are transferred to the user.

FIG. 4 illustrates that a surface configuring a joint removal structure, for example, the joint removal structure 420, is a curved surface. However, a surface configuring a joint removal structure may be a flat surface 421 in at least one other example embodiment.

The transparent optical layer 430 is may adjust a moving distance of beams from the display panels 110 to the lens array 410, and is disposed between the display panels 110 and the light path adjusters 120. For example, the transparent optical layer 430 may be a transparent flat glass plate. The transparent optical layer 430 has a thickness set based on a focal distance value of the lens array 410 such that a focal point of the lens array 410 is in the display areas 230 and 231 of the display panels 110. A gap between the light path adjusters 120 and the transparent optical layer 430 is a vacuum or filled with a gas, a liquid, or a solid.

FIGS. 5 through 8 illustrate examples of which a joint removal structure included in a light path adjuster in multiple layers is a wedge-shaped groove structure according to at least one example embodiment.

Figure 5:
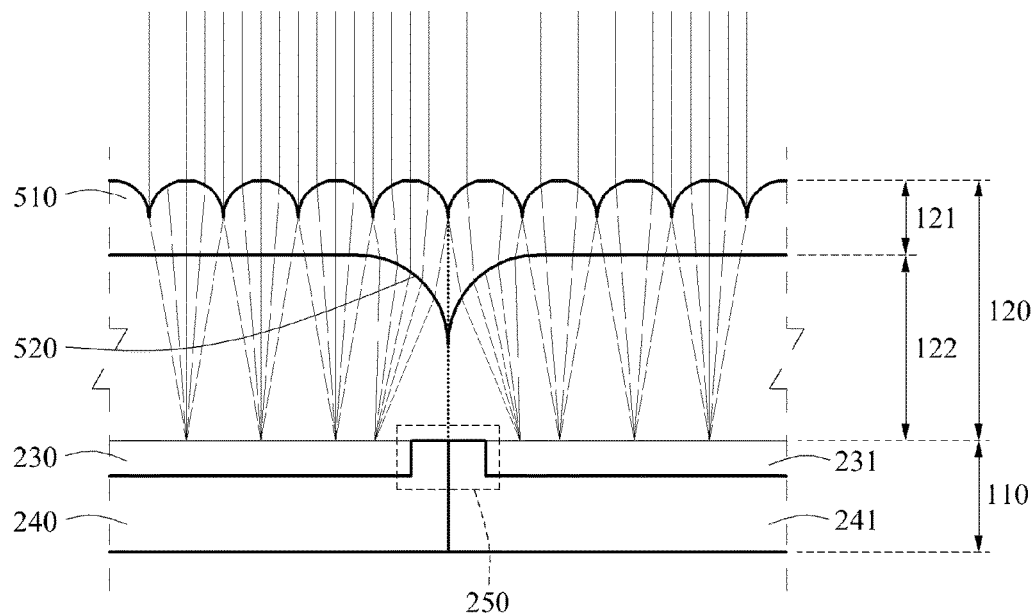
FIGS. 5 through 8 illustrate examples of which a joint removal structure included in a light path adjuster in multiple layers is a wedge-shaped groove structure according to at least one example embodiment.

FIG. 5 illustrates an example of the light path adjusters 120 including a joint removal structure 520 corresponding to a wedge-shaped groove structure. The joint removal structure 520 is provided in two layers. In this example, the light path adjusters 120 includes a lens array layer 121 disposed on upper portions of the light path adjusters 120 and a joint removal layer 122 disposed on lower portions of the light path adjusters 120.

A lens array 510 is included on one side of the lens array layer 121 and a flat structure is included on another side of the lens array layer 121. Referring to FIG. 5, the lens array 510 is disposed on a front surface of the lens array layer 121, and the flat structure is disposed on a back surface of the lens array layer 121.

The joint removal structure 520 is included on one side of the joint removal layer 122, and the flat structure is included on another side of the joint removal layer 122. The flat structure is disposed on the back surface of the joint removal layer 122. The joint removal structure 520 is disposed on a portion corresponding to the connecting joint 250 among the front surface of the joint removal layer 122. The flat structure is disposed on a portion corresponding to the display areas 230 and 231 of the display panels 110. A cross section of the joint removal structure 520 is a curved surface. In another example, a cross section of the joint removal structure 520 may be a flat surface.

A transparent optical layer may also be disposed between the display panels 110 and the light path adjusters 120. The transparent optical layer adjusts a moving distance of beams from the display panels 110 to the lens array 510 such that a focal point of the lens array 510 is on the display panels 110.

Hereinafter, differences on various examples of the joint removal structure 520 corresponding to the wedge-shaped groove structure included in a light path adjuster with multiple layers will be described with reference to FIGS. 6 and 8.

Figure 6:
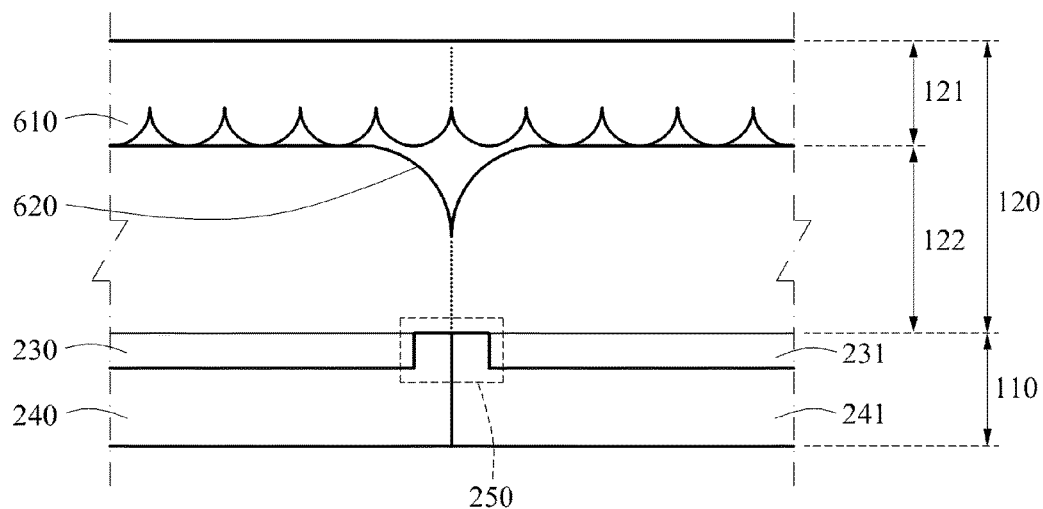

FIG. 6 illustrates another example of the light path adjusters 120 including a joint removal structure 620 corresponding to a wedge-shaped groove structure, and the joint removal structure 620 is provided in two layers. In this example, the lens array 610 is disposed on a back surface of the lens array layer 121 included in the light path adjusters 120.

The joint removal structure 620 is included on one side of the joint removal layer 122, and a flat structure is included on another side of the joint removal layer 122. The joint removal structure 620 is disposed on a portion corresponding to the connecting joint 250 among a front surface of the joint removal layer 122. The flat structure is disposed on a portion corresponding to the display areas 230 and 231 of the display panels 110. A cross section of the joint removal structure 620 is a curved surface. In another example, a cross section of the joint removal structure may be a flat surface.

Figure 7:
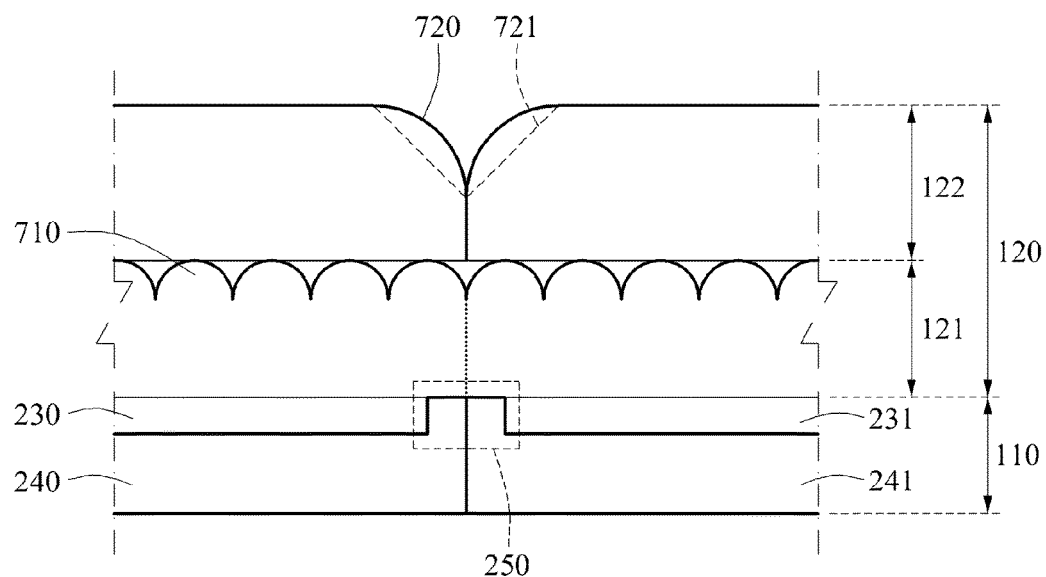

FIG. 7 illustrates still another example of the light path adjusters 120 including a joint removal structure 720 corresponding to a wedge-shaped groove structure, and the joint removal structure 720 is provided in two layers. In this example, the light path adjusters 120 includes the lens array layer 121 disposed on lower portions of the light path adjusters and the joint removal layer 122 disposed on upper portions of the light path adjusters 120.

The joint removal structure 720 is disposed on a portion corresponding to the connecting joint 250 among a front surface of the joint removal layer 122. A flat structure is disposed on a portion corresponding to the display areas 230 and 231 of the display panels 110. A cross section of the joint removal structure 720 illustrated in FIG. 7 is a curved surface. However, a cross section of a joint removal structure may be a flat surface 721.

Figure 8:
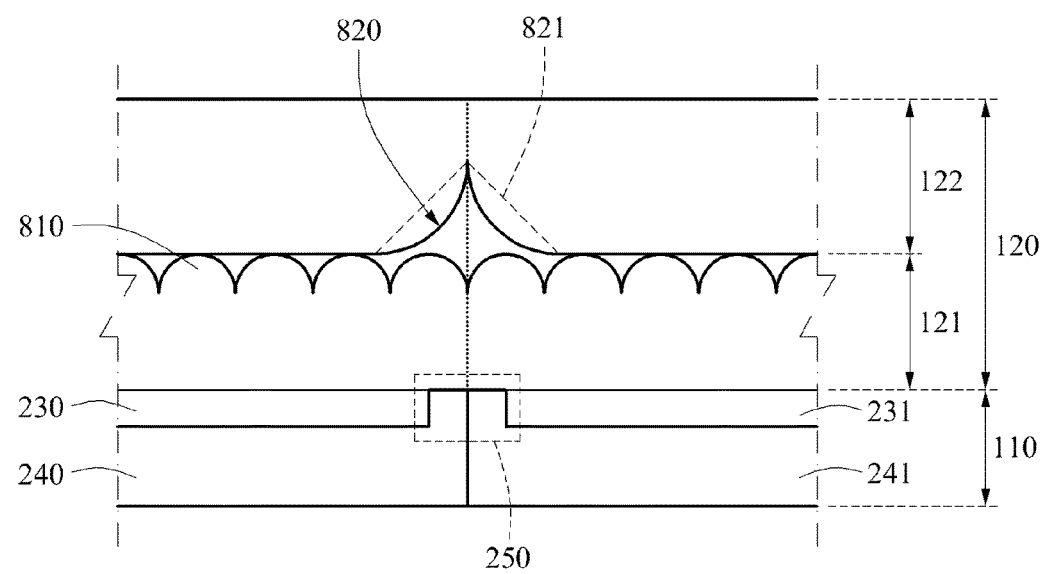

FIG. 8 illustrates a further example of the light path adjusters 120 including a joint removal structure 820 corresponding to a wedge-shaped groove structure, and the joint removal structure 820 is provided in two layers. In this example, a flat structure is included in a front surface of the joint removal layer 122 included in the light path adjusters 120, and the joint removal structure 820 is included in a back surface of the joint removal layer 122.

The joint removal structure 820 is disposed on a portion corresponding to the connecting joint 250 among a back surface of the joint removal layer 122. A flat structure is disposed on a portion corresponding to the display areas 230 and 231 of the display panels 110. A cross section of the joint removal structure 820 illustrated in FIG. 8 is a curved surface. However, a cross section of a joint removal structure may be a flat surface 821.

FIGS. 9 through 12 illustrate examples of a joint removal structure included in a light path adjuster in a single layer to which a Fresnel lens structure is applied according to at least one example embodiment.

Figure 9:
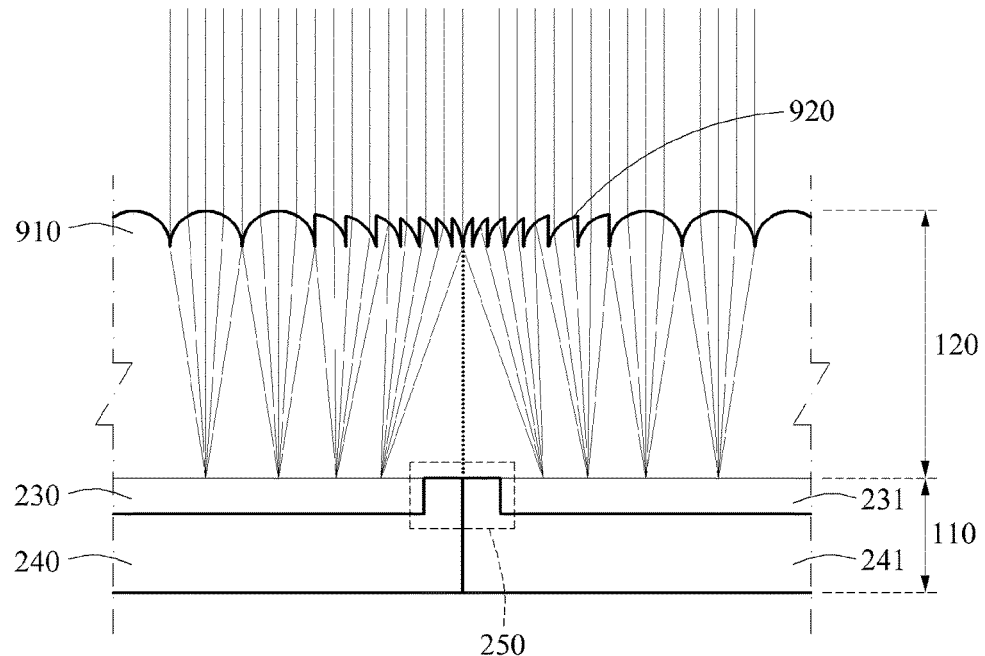
FIGS. 9 through 12 illustrate examples of a joint removal structure included in a light path adjuster in a single layer to which a Fresnel lens structure is applied according to at least one example embodiment.

FIG. 9 illustrates an example of the light path adjusters 120 including a joint removal structure 920 to which a Fresnel lens structure is applied. The joint removal structure 920 is formed in a single layer.

A lens array 910 and a joint removal structure 920 are included on an identical side of the light path adjusters 120. The lens array 910 and the joint removal structure 920 are included on a front surface of the light path adjusters 120 illustrated in FIG. 9.

The front surface of the light path adjusters 120 may be divided into a first area and a second area. The first area is a portion corresponding to the display areas 230 and 231, and the lens array 910 is included in the first area. The second area is a portion corresponding to the connecting joint 250, and the joint removal structure 920 is included in the second area. The joint removal structure is a structure to which the Fresnel lens structure is applied. For example, the joint removal structure 920 is a structure of combining the lens array 910 and the Fresnel lens structure. The joint removal structure 920 may refract beams incident to the second area, so that beams emitted from the display areas 230 and 231 are transferred to a user. Concisely, the joint removal structure 920 of the second area may refract the beams incident to the second area in order for the connecting joint 250 not to be exposed to the user.

Hereinafter, differences on various examples of the joint removal structure 920 included in a light path adjuster in a single layer, to which the Fresnel structure is applied will be described with reference to FIGS. 10 through 12.

Figure 10:
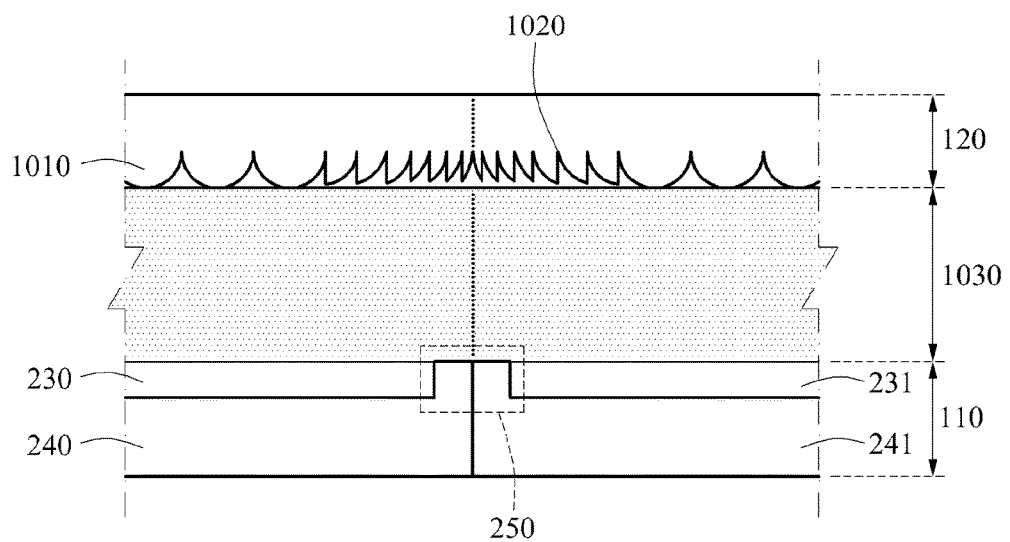

FIG. 10 illustrates another example of the light path adjusters 120 including a joint removal structure 1020 to which the Fresnel lens structure is applied. The joint removal structure 1020 is formed in a single layer. A lens array 1010 and the joint removal structure 1020 are included on a back surface of the light path adjusters 120 and a flat structure is included on a front surface of the light path adjusters 120.

The back surface of the light path adjusters 120 may be divided into a first area and a second area. The first area is a portion corresponding to the display areas 230 and 231. The first area includes the lens array 1010. The second area is a portion corresponding to the connecting joint 250. The second area includes the joint removal structure 1020. The joint removal structure 1020 is a structure to which the Fresnel lens structure is applied. For example, the joint removal structure 1020 is a structure of combining the lens array 1010 and the Fresnel lens structure. The joint removal structure 1020 may refract beams incident to the second area, so that beams emitted from the display areas 230 and 231 are transferred to a user.

A transparent optical layer 1030 is disposed between the display panels 110 and the light path adjusters 120. The transparent optical layer 1030 is an apparatus for adjusting a moving distance of beams from the display panels 110 to the lens array 1010. For example, the transparent optical layer 1030 may be a transparent flat glass plate. The transparent optical layer 1030 has a thickness set based on a focal distance value of the lens array 1010 such that a focal point of the lens array 1010 is on the display areas 230 and 231 of the display panels 110.

Figure 11:
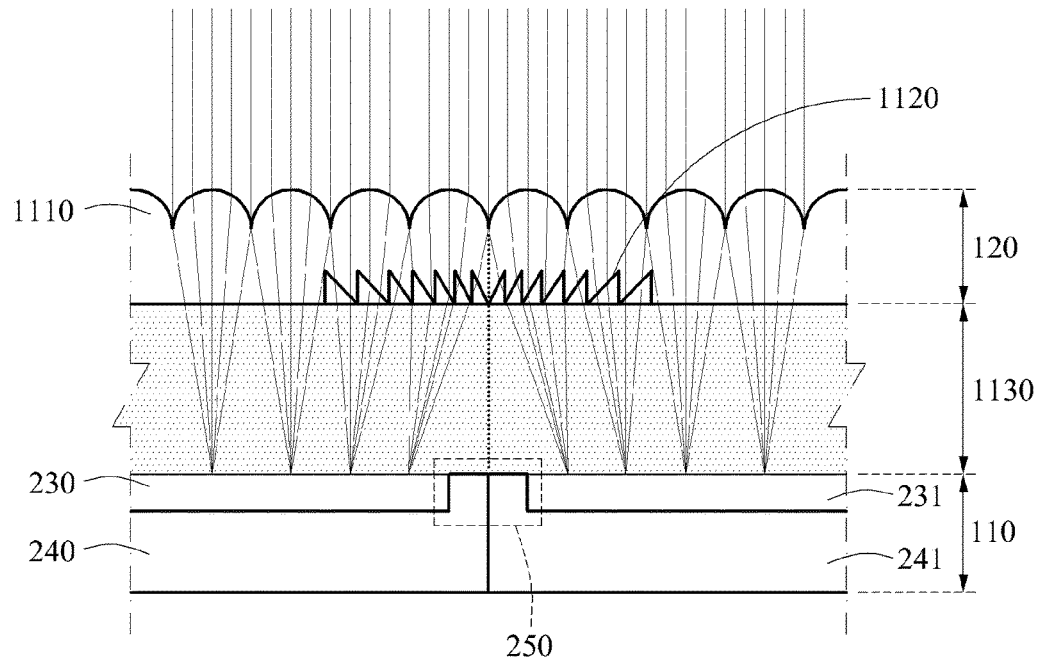

FIG. 11 illustrates still another example of the light path adjusters 120 including a joint removal structure 1120 to which a Fresnel lens structure is applied. The joint removal structure 1120 is formed in a single layer. A lens array 1110 and the joint removal structure 1120 are disposed on different sides of the light path adjusters 120.

A back surface of the light path adjusters 120 may be divided into a first area and a second area. The first area is a portion corresponding to the display areas 230 and 231. The first area includes a flat structure. The second area is a portion corresponding to the connecting joint 250. The second area includes the joint removal structure 1120. The joint removal structure 1120 is a structure to which the Fresnel lens structure is applied. The joint removal structure 1120 may refract beams incident to the second area, so that beams emitted from the display areas 230 and 231 are transferred to a user.

A transparent optical layer 1130 is disposed between the display panels 110 and the light path adjusters 120. The transparent optical layer 1130 is an apparatus for adjusting a moving distance of beams from the display panels 110 to the lens array 1110. For example, the transparent optical layer 1130 may be a transparent flat glass plate.

Figure 12:
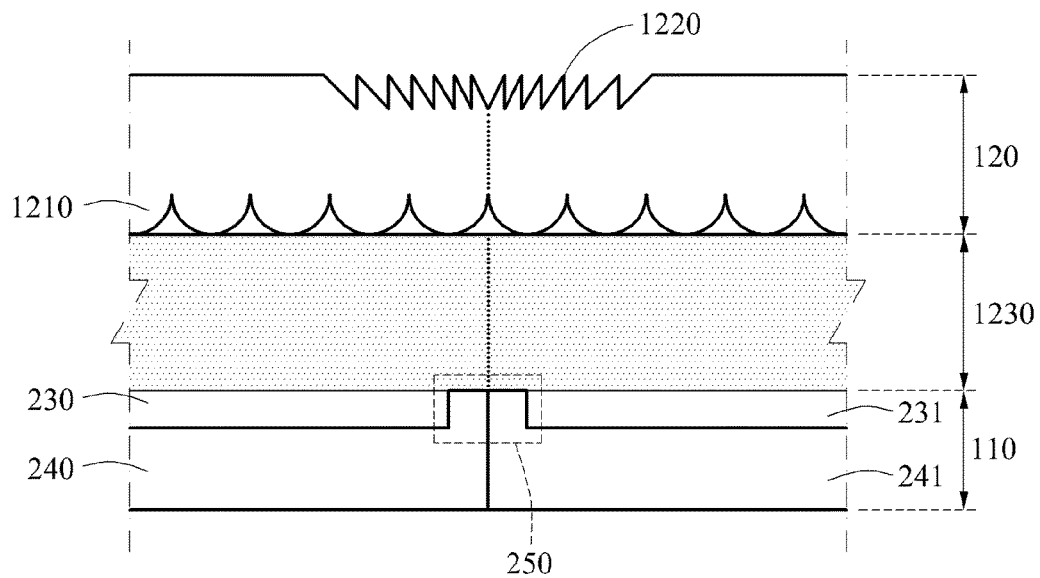

FIG. 12 illustrates a further example of the light path adjusters 120 including a joint removal structure 1220 to which a Fresnel lens structure is applied, and the joint removal structure 1220 is formed in a single layer. A lens array 1210 and the joint removal structure 1220 are disposed on different sides of the light path adjusters 120.

A front surface of the light path adjusters 120 may be divided into a first area and a second area. The first area is a portion corresponding to the display areas 230 and 231. The first area includes a flat structure. The second area is a portion corresponding to the connecting joint 250. The second area includes the joint removal structure 1220. The joint removal structure 1220 is a structure to which the Fresnel lens structure is applied. The joint removal structure 1220 may refract beams incident to the second area, so that beams emitted from the display areas 230 and 231 are transferred to a user.

The lens array 1210 is included in a back surface of the light path adjusters 120. A transparent optical layer 1230 is disposed between the display panels 110 and the light path adjusters 120. The transparent optical layer 1230 is an apparatus for adjusting a moving distance of beams from the display panels 110 to the lens array 1210. For example, the transparent optical layer 1230 may be a transparent flat glass plate.

Figure 13:
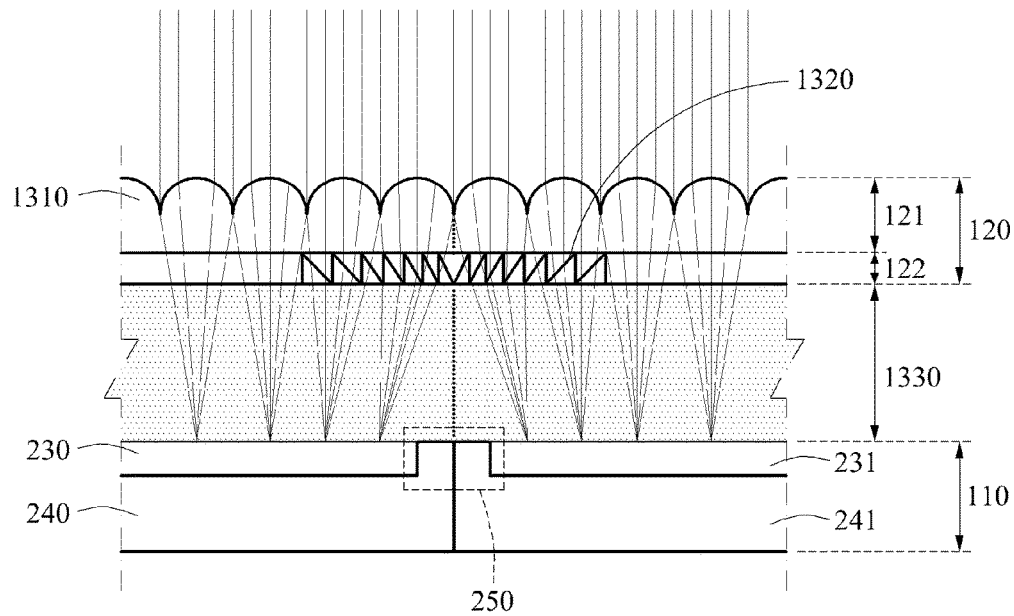
FIGS. 13 through 14 illustrate examples of a joint removal structure included in a light path adjuster in multiple layers to which a Fresnel lens structure is applied according to at least one example embodiment.
Figure 14:
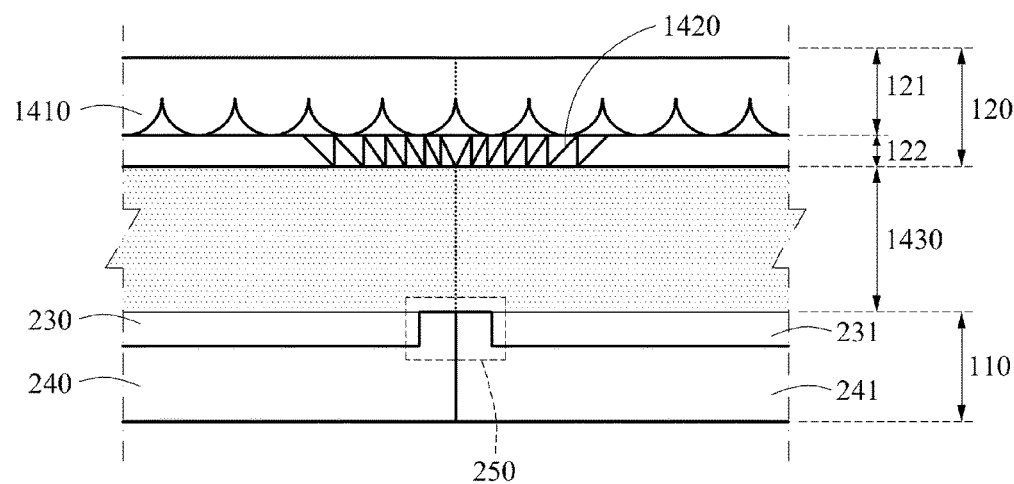

FIGS. 13 through 14 illustrate examples of a joint removal structure included in a light path adjuster in multiple layers to which a Fresnel lens structure is applied according to at least one example embodiment.

FIG. 13 illustrates an example of the light path adjusters 120 including a joint removal structure 1320 to which a Fresnel lens structure is applied. The joint removal structure 1320 is provided in two layers. In this example, the light path adjusters 120 includes the lens array layer 121 disposed on upper portions of the light path adjusters 120 and the joint removal layer 122 disposed on lower portions of the light path adjusters 120.

The lens array 1310 is included on a front surface of the lens array layer 121, and the flat surface is directed toward a user. A flat structure is included on a back surface of the lens array layer 121. The joint removal structure 1320 is included on a front surface of the joint removal layer 122, and the flat structure is included on a back surface of the joint removal layer 122.

The front surface of the joint removal layer 122 may be divided into a first area and a second area. The first area is a portion corresponding to the display areas 230 and 231, and the first area includes a flat structure. The second area is a portion corresponding to the connecting joint 250, and the second area includes the joint removal structure 1320. In this example, the joint removal structure 1320 may be a structure to which the Fresnel lens structure is applied.

A gap between the lens array layer 121 and the joint removal layer 122 is a vacuum or filled with a gas, a liquid, or a solid.

A transparent optical layer 1330 may be disposed between the display panels 110 and the light path adjusters 120. The joint removal layer 122 and the transparent optical layer 1330 may be provided in a single combination layer. The combination layer includes the joint removal structure 1320 on a front surface of the combination layer, and has a thickness corresponding to a focal distance of the lens array 1310.

Hereinafter, differences on various examples of the joint removal structure 1320 to which the Fresnel structure is applied included in a light path adjuster in a single layer will be described with reference to FIG. 14.

FIG. 14 illustrates an example of the light path adjusters 120 including a joint removal structure 1420 to which a Fresnel lens structure is applied. The joint removal structure 1420 is provided in two layers. The light path adjusters 120 include a lens array 1410 and a joint removal structure 1420 in different layers.

The light path adjusters 120 include the lens array layer 121 disposed on upper portions of the light path adjusters 120 and the joint removal layer 122 disposed on lower portions of the light path adjusters 120. The lens array 1410 is included on a back surface of the lens array layer 121, and a flat structure is included on a front surface of the lens array layer 121. The joint removal structure 1420 is included on a front surface of the joint removal layer 122, and the flat structure is included on a back surface of the joint removal layer 122.

A transparent optical layer 1430 may be disposed between the display panels 110 and the light path adjusters 120.

Descriptions of the light path adjusters 120 included in a display device are provided with reference to FIGS. 2 through 14. However, the light path adjusters 120 are not limited to the descriptions, and detailed structures of the light path adjusters 120 are variously combined and changed based on a design.

Figure 15A:
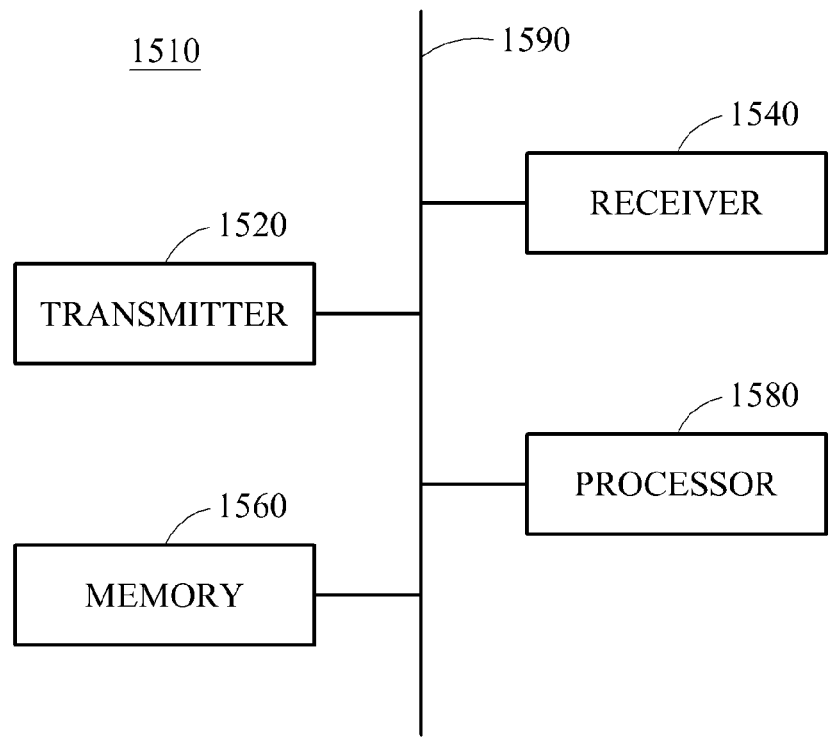
FIGS. 15A and 15B illustrate a device and method for correcting a deformation of an image displayed on a plurality of display panels according to at least one example embodiment.
Figure 15B:
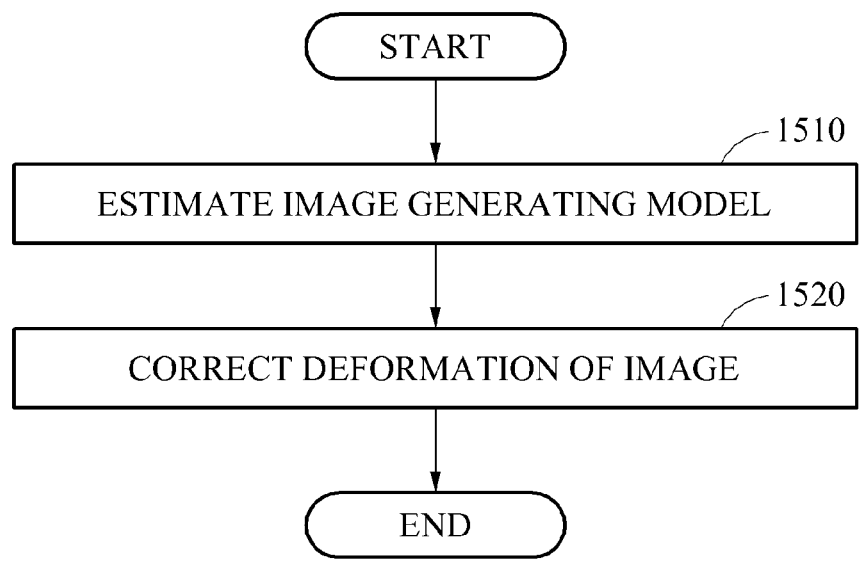

FIGS. 15A and 15B illustrate a device and method for correcting a deformation of an image displayed on a plurality of display panels according to at least one example embodiment.

FIG. 15A is a diagram illustrating an example structure of an image processing apparatus according to an example embodiment. According to at least one example embodiment, the image processing apparatus 1510 may be configured for use in a display (e.g., the display 100 device in FIG. 1). The image processing apparatus 1510 may include, for example, a data bus 1590, a transmitter 1520, a receiver 1540, a memory 1560, and a processor 1580 (i.e., a special purpose processor).

The transmitter 1520, receiver 1540, memory 1560, and processor 1580 may send data to and/or receive data from one another using the data bus 1590. The transmitter 1520 is a device that includes hardware and any necessary software for transmitting wireless signals including, for example, data signals, control signals, and other information via one or more connections to other elements of the display device 100.

The receiver 1540 is a device that includes hardware and any necessary software for receiving wireless signals including, for example, data signals, control signals, and other information via one or more connections to other elements of the display device 100.

The memory 1560 may be a device capable of storing data and computer readable instructions. The memory 1560 may include a magnetic storage, flash storage, etc.

The processor 1580 may be a device capable of processing data including, for example, a special purpose processor configured to carry out specific operations based on input data, or capable of executing instructions included in computer readable code. For example, it should be understood that the modifications and methods described below may be stored on the memory 1560 and implemented by the processor 1580 within image processing apparatus 1510.

Further, it should be understood that the below modifications and methods may be carried out by one or more of the above described elements of the image processing apparatus 1510. For example, the receiver 1540 may carry out steps of "receiving," "acquiring," and the like; transmitter 1520 may carry out steps of "transmitting," "outputting," "sending" and the like; processor 1580 may carry out steps of "determining," "generating", "correlating," "calculating," and the like; and memory 1560 may carry out steps of "storing," "saving," and the like.

FIG. 15B illustrates a method of correcting a deformation of an image displayed on a plurality of display panels, which may be performed by the image processing apparatus 1510.

A deformation may be generated in an image displayed in the plurality of display panels due to a joint removal structure. Accordingly, correcting the deformation of the image displayed on the plurality of display panels may be additionally requested.

In operation 1510, the processor 1580 estimates an image generating model. The processor 1580 may cause the display device to display a code image including a desired (or alternatively, predetermined) code pattern on the plurality of display panels. The processor 1580 may receive a photographed image from an image sensor that photographs the code image.

The processor 1580 may determine a corresponding relation between pixels included in the code image and pixels included in the photographed image, through a decoding process with respect to the code image and the photographed image. The processor 1580 may estimate the image generating model based on the corresponding relation. Here, the image generating model is a model used for generating the image displayed in the display device 100. The image generating model may represent a process in which beams emitted from each pixel included in a flat surface display are mapped to a 3D space.

In operation 1520, the processor 1580 corrects the deformation of the image displayed on the plurality of display panels based on the image generating model.

The processor 1580 may cross the beams emitted from the pixel included in the plurality of display panels and a 3D object to be displayed and allocate a color value of a crossed point to the corresponding pixel, so that an image to be displayed on the plurality of display panels may be obtained. Therefore, the processor 1580 may correct the deformation of the image displayed on the plurality of display panels, based on a radio wave condition of a beam considering a refraction generated in a lens array and a joint removal structure.

According to an example embodiment, a joint removal structure is disposed in the light path adjusters in order for a connecting joint to connect the plurality of display panels not to be exposed to a user, thereby providing a high-quality image for the user.

According to an example embodiment, an optical structure in which the connecting joint to connect the plurality of display panels is not exposed to the user is provided in the light path adjusters, thereby providing a larger image using display panels in small sizes.

According to an example embodiment, a thickness of a transparent optical layer is adjusted based on a focal distance value of a lens array, so that the user may clearly view an image displayed on the plurality of display panels.

According to an example embodiment, a deformation of the image displayed on the plurality of display panels is corrected using the estimated image generating model, thereby displaying a more natural 3D image even in a large display using the plurality of display panels.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A display device comprising:
a plurality of display panels; and
light path adjusters disposed on upper portions of the plurality of the display panels, the light path adjusters including, a lens array on one side of the light path adjusters, the lens array being configured to transfer different beams emitted from the plurality of display panels to each eye of a user to allow the user to view a three-dimensional image; and a joint removal structure on a first boundary between light path adjusters and corresponding to a connecting joint on a second boundary between display panels, the joint removal structure connecting the plurality of display panels and being configured to refract the beams emitted from a part of a display panel that is adjacent to the second boundary, wherein a shape of the light path adjusters at the joint removal structure and a shape of the light path adjusters outside of the joint removal structure are different, wherein at least a portion of a surface of the light path adjusters is rounded and at least a portion of a surface of the light path adjusters is a series of substantially semi-circular light path adjusters, and wherein the lens array and the joint removal structure are disposed on a single layer of the light path adjusters.

2. The device of claim 1, wherein the joint removal structure is configured to refract the beams emitted from the plurality of display panels so that the connecting joint is not exposed to the user.

3. The device of claim 1, wherein the joint removal structure follows a boundary direction of the plurality of display panels.

4. The device of claim 1, wherein the light path adjusters form a layer, and the lens array and the joint removal structure are disposed on a same side or different sides of the layer.

5. The device of claim 1, wherein the light path adjusters include a lens array layer and a joint removal layer, the lens array is disposed on one side of the lens array layer, and the joint removal structure is disposed on one side of the joint removal layer.

6. The device of claim 1, wherein a number of joint removal structures is equal to a number of connecting joints connecting the plurality of display panels.

7. The device of claim 1, wherein the joint removal structure is a wedge-shaped groove structure.

8. The device of claim 7, wherein a cross section of the wedge-shaped groove structure is a flat surface or a curved surface.

9. The device of claim 7, wherein a space within the wedge-shaped groove structure is a vacuum or is filled with a gas, a liquid, or a solid.

10. The device of claim 1, wherein the joint removal structure has a Fresnel lens structure.

11. The device of claim 10, wherein, when the lens array and the joint removal structure are disposed on a same side of the light path adjusters, a first area of the light path adjusters corresponding to the plurality of display panels includes the lens array, and a second area of the light path adjusters corresponding to the connecting joint includes the Fresnel lens structure.

12. The device of claim 1, further comprising:

a transparent optical layer disposed between the light path adjusters and the plurality of display panels and configured to adjust a distance between the plurality display panels and the lens array.

13. The device of claim 12, wherein a gap between the light path adjusters and the transparent optical layer is a vacuum or is filled with a gas, a liquid, or a solid.

14. The device of claim 1, further comprising:

a processor configured to correct a deformation of an image displayed on the plurality of display panels.

15. The device of claim 14, wherein the processor is configured to, receive a photographed image from an image sensor, the photographed image being a code image displayed on the plurality of display panels, estimate an image generating model based on the code image and the photographed image, and correct the deformation of the image displayed on the plurality of display panels.

16. A light path adjuster to guide beams emitted from a display panel, the light path adjuster comprising:

a lens array on one side of the light path adjuster, the lens array being configured to transfer the beams emitted from the display panel to each eye of a user to allow the user to view a three-dimensional image; and a joint removal structure on a first boundary between lenses of the lens array and corresponding to a connecting joint disposed on a second boundary between the display panel and another display panel, the joint removal structure connecting the display panel with the another display panel and being configured to refract the beams emitted from a part of the display panel adjacent to the second boundary, wherein a shape of the light path adjusters at the join removal structure and a shape of the light path adjusters outside of the joint removal structure are different, wherein at least a portion of a surface of the light path adjusters is rounded and at least a portion of a surface of the light path adjusters is a series of substantially semi-circular light path adjusters, and wherein the lens array and the joint removal structure are disposed on a single layer of the light path adjusters.

17. The light path adjuster of claim 16, wherein the joint removal structure is configured to refract the beams emitted from the display panel so that the connecting joint is not exposed to the user.

18. The light path adjuster of claim 16, wherein the joint removal structure follows a boundary direction between the display panel and another display panel.

19. The light path adjuster of claim 16, wherein the lens array and the joint removal structure are disposed on an identical side or different sides of a layer of the light path adjuster.

20. The light path adjuster of claim 16, wherein the lens array is disposed on one side of a lens array layer, and the joint removal structure is disposed on one side of a joint removal layer.

* * * * *